(12) United States Patent
Lake et al.

(10) Patent No.: US 8,662,187 B2
(45) Date of Patent: Mar. 4, 2014

(54) PERMANENT MAGNET LINEAR MOTOR ACTUATED SAFETY VALVE AND METHOD

(75) Inventors: Gary Lake, Houston, TX (US); Michael J. May, Broken Arrow, OK (US); Priyesh Ranjan, Houston, TX (US); Douglas Murray, Magnolia, TX (US); Michael Rainone, Palestine, TX (US); Samuel Sackett, Frankston, TX (US); Talbot Presley, Palestine, TX (US)

(73) Assignee: Baker Hughes Incorporated, Houston, TX (US)

( * ) Notice: Subject to any disclaimer, the term of this patent is extended or adjusted under 35 U.S.C. 154(b) by 892 days.

(21) Appl. No.: 12/540,931

(22) Filed: Aug. 13, 2009

(65) Prior Publication Data

US 2011/0037004 A1 Feb. 17, 2011

(51) Int. Cl.
*E21B 34/06* (2006.01)
(52) U.S. Cl.
USPC ..... 166/373; 251/129.01; 251/65; 166/332.8; 335/229; 335/266; 335/282; 335/296; 335/306
(58) Field of Classification Search
USPC ......... 251/65, 129.01; 166/332.1, 332.8, 319, 166/373; 335/229, 266, 282, 296, 299, 302, 335/306
See application file for complete search history.

(56) References Cited

U.S. PATENT DOCUMENTS

| | | |
|---|---|---|
| 2,785,755 A | 3/1957 | En Dean |
| 3,755,706 A * | 8/1973 | Scott .............................. 315/3.5 |
| 4,687,054 A | 8/1987 | Russell et al. |
| 5,252,043 A | 10/1993 | Bolding et al. |
| 5,409,356 A | 4/1995 | Massie |
| 5,620,048 A | 4/1997 | Beauquin |
| 5,734,209 A | 3/1998 | Hallidy |
| 5,831,353 A | 11/1998 | Bolding et al. |
| 5,917,774 A | 6/1999 | Walkow et al. |
| 5,959,374 A * | 9/1999 | Anderson et al. ............... 310/13 |
| 5,960,875 A | 10/1999 | Beauquin et al. |
| 6,039,014 A * | 3/2000 | Hoppie ..................... 123/90.11 |
| 6,619,388 B2 | 9/2003 | Dietz et al. |
| 6,926,504 B2 | 8/2005 | Howard |
| 6,988,556 B2 | 1/2006 | Vick, Jr. |
| 7,145,271 B2 | 12/2006 | Thirunarayan et al. |
| 7,213,653 B2 | 5/2007 | Vick, Jr. |
| 7,252,053 B2 * | 8/2007 | Froeschle et al. .......... 123/90.11 |
| 7,316,270 B2 | 1/2008 | Shen |
| 7,370,709 B2 | 5/2008 | Williamson |
| 7,373,971 B2 | 5/2008 | Montgomery |

(Continued)

OTHER PUBLICATIONS

Dexter Magnetic Technologies, Inc., "MagneGear Linear Magnetic Gear—Magnetically Geared and Sprung Safety Valve", www.dextermag.com, pp. 1-2.

(Continued)

*Primary Examiner* — John Rivell
*Assistant Examiner* — Minh Le
(74) *Attorney, Agent, or Firm* — Cantor Colburn LLP

(57) ABSTRACT

A linear motor activator for a downhole safety valve including a permanent magnet carrier; a plurality of permanent magnets mounted to the permanent magnet carrier; a coil carrier disposed in magnetic field proximity to the permanent magnet carrier; and a plurality of coils mounted to the coil carrier, one of the permanent magnet carrier and the coil carrier being movable relative to the other of the permanent magnet carrier and coil carrier, and being connected to a component of a downhole safety valve and method.

3 Claims, 6 Drawing Sheets

(56) References Cited

U.S. PATENT DOCUMENTS

| | | |
|---|---|---|
| 7,434,626 B2 | 10/2008 | Vick |
| 7,686,597 B2 * | 3/2010 | Ries ............................ 417/416 |
| 7,743,833 B2 * | 6/2010 | Cascario et al. ............. 166/375 |
| 8,267,167 B2 | 9/2012 | Lake et al. |
| 2001/0026204 A1 * | 10/2001 | Petro ............................ 335/229 |
| 2002/0000904 A1 * | 1/2002 | Compter et al. .............. 335/229 |
| 2003/0121665 A1 * | 7/2003 | Trott et al. ................. 166/332.8 |
| 2004/0003849 A1 * | 1/2004 | Rausch et al. ................ 137/554 |
| 2005/0087335 A1 | 4/2005 | Vick, Jr. |
| 2006/0157255 A1 * | 7/2006 | Smith ........................... 166/374 |
| 2006/0261300 A1 * | 11/2006 | Merabet et al. ................. 251/65 |
| 2007/0284118 A1 * | 12/2007 | Benton ......................... 166/386 |
| 2007/0289734 A1 | 12/2007 | McDonald et al. |
| 2007/0295515 A1 | 12/2007 | Veneruso et al. |
| 2008/0053662 A1 | 3/2008 | Williamson et al. |
| 2008/0066921 A1 * | 3/2008 | Bane et al. .................... 166/316 |
| 2008/0110611 A1 | 5/2008 | Bane et al. |
| 2008/0191155 A1 * | 8/2008 | Scollay ........................... 251/65 |
| 2008/0272870 A1 * | 11/2008 | Miyamoto .................... 335/229 |
| 2008/0314599 A1 * | 12/2008 | Bane et al. .................... 166/375 |
| 2009/0250206 A1 | 10/2009 | Lake et al. |
| 2009/0277687 A1 | 11/2009 | Lee |
| 2010/0025045 A1 | 2/2010 | Lake et al. |
| 2011/0120728 A1 | 5/2011 | Lake et al. |

OTHER PUBLICATIONS

Timothy Price, William McDonald, Gareth Hatch, "The MagneGear Efficient rotary and Linear Magnetic Gearing Devices for Downhole Applications", Technical Paper, Dexter Magnetic Technologies, Inc., Apr. 2007, pp. 1-4.

International Search Report and Written Opinion, Mailed Apr. 22, 2010, International Appln. No. PCT/US2010/044858, Written Opinion 4 Pages, International Search Report 3 Pages.

International Search Report and Written Opinion, Mailed Jun. 17, 2011, International Appln. No. PCT/US2010/056700, Written Opinion 3 Pages, International Search Report 3 Pages.

International Search Report and Written Opinion, Mailed Jun. 15, 2011, International Appln. No. PCT/US2010/056215, Written Opinion 2 Pages, International Search Report 3 Pages.

* cited by examiner

PERMANENT MAGNET LINEAR MOTOR ACTUATED SAFETY VALVE AND METHOD

BACKGROUND

Surface Controlled Subsurface Safety Valves (SCSSV) are a common part of most wellbores in the hydrocarbon industry. Subsurface safety valves are generally located below the surface and allow production from a well while being closable at a moments notice should an imbalance in the operation of the well be detected either at the surface or at another location. In most constructions, SCSSVs are actively openable and passively closable ensuring that failures of the actuating system allow the valve to "fail safe" or in other words, fail in a closed position. Traditional subsurface safety valves have been hydraulically actuated. As operators move into deeper water, the use of hydraulics as the means of actuating subsurface safety valves becomes technically challenging as well as expensive. The technical limitations of hydraulics, the costs and reliability restrictions associated with hydraulics, and environmental issues are all work synergistically to increase costs of production, which necessarily results in lower profitability or increased pricing of the produced fluids. In view of these drawbacks, the art will well receive alternate SCSSV actuation systems that alleviate the same.

SUMMARY

A linear motor activator for a downhole safety valve including a permanent magnet carrier; a plurality of permanent magnets mounted to the permanent magnet carrier; a coil carrier disposed in magnetic field proximity to the permanent magnet carrier; and a plurality of coils mounted to the coil carrier, one of the permanent magnet carrier and the coil carrier being movable relative to the other of the permanent magnet carrier and coil carrier, and being connected to a component of a downhole safety valve.

A downhole safety valve including a permanent magnet carrier; a plurality of permanent magnets mounted to the permanent magnet carrier; a coil carrier disposed in magnetic field proximity to the permanent magnet carrier; a plurality of coils mounted to the coil carrier, one of the permanent magnet carrier and the coil carrier being movable relative to the other of the permanent magnet carrier and coil carrier, and being connected to a component of a downhole safety valve; and a controller configured to sequentially power phases of coils to cause the permanent magnet carrier to actuate the safety valve.

A tubing pressure insensitive actuator system including a housing having a bore therein; a force transmitter sealingly moveable within the bore the force transmitter defining with the bore two fluid chambers, one at each longitudinal end of the force transmitter; at least two seals sealingly positioned between the housing and the force transmitter, one of the seals isolating one end of the force transmitter from tubing pressure and another of the seals isolating another end of the force transmitter from tubing pressure; an activator having: a permanent magnet carrier; a plurality of permanent magnets mounted to the permanent magnet carrier; a coil carrier disposed in magnetic field proximity to the permanent magnet carrier; and a plurality of coils mounted to the coil carrier, one of the permanent magnet carrier and the coil carrier being movable relative to the other of the permanent magnet carrier and coil carrier, and being connected to the force transmitter.

A tubing pressure insensitive actuator system for an electric surface controlled subsurface safety valve including a subsurface safety valve housing supporting a flow tube, a flapper and a power spring, the housing having a force transmitter bore therein; a force transmitter sealingly moveable within the force transmitter bore, the force transmitter defining with the bore two fluid chambers, one at each longitudinal end of the force transmitter, at least one of the chambers containing an electric activator in operable communication with the force transmitter; an interengagement at the force transmitter, force transmissively engaged with the flow tube, the interengagement exposed to tubing pressure during use; at least two seals sealingly positioned between the housing and the force transmitter, one of the seals isolating one end of the force transmitter from tubing pressure and another of the seals isolating another end of the force transmitter from tubing pressure; an activator having: a permanent magnet carrier; a plurality of permanent magnets mounted to the permanent magnet carrier; a coil carrier disposed in magnetic field proximity to the permanent magnet carrier; and a plurality of coils mounted to the coil carrier, one of the permanent magnet carrier and the coil carrier being movable relative to the other of the permanent magnet carrier and coil carrier, and being connected to the force transmitter.

A method for reducing force requirements of an actuator in a downhole environment including sealing a force transmitter within a housing to isolate ends of the force transmitter from tubing pressure during use; initiating an activator having: a permanent magnet carrier; a plurality of permanent magnets mounted to the permanent magnet carrier; a coil carrier disposed in magnetic field proximity to the permanent magnet carrier; a plurality of coils mounted to the coil carrier, one of the permanent magnet carrier and the coil carrier being movable relative to the other of the permanent magnet carrier and coil carrier, and being connected to the force transmitter; and urging the force transmitter in a direction commensurate with activating a downhole tool, the actuator generating enough force to activate the downhole tool other than to overcome tubing pressure.

BRIEF DESCRIPTION OF THE DRAWINGS

Referring now to the drawings wherein like elements are numbered alike in the several Figures.

DETAILED DESCRIPTION

Among the challenges in developing an actuator system for, for example, an electric safety valve, or other tool intended to operate in an unfriendly environment such as a downhole environment, are isolation of an activator of the actuator from wellbore fluids during use and issues relating to force generation density. In order to avoid confusion in reading the instant disclosure, the term "actuator" is used to refer to the system level while the "activator" is used to refer to a prime mover level. With regard to the latter, isolation of the activator mechanism from the environmental factors that are problematic for the activator, is desirable. Many wellbore fluids are contraindicated for contact with electrical activators due to their deleterious effects thereon. Moreover, with regard to the latter, force generation in an electric activator that rivals the force generating capacity of hydraulic activators, requires a significant increase in size of the activator relative to the hydraulic activators. Wellbore space is always at a premium so that it is desirable to maintain activator size as small as possible. To realize this goal, some embodiments minimize the effect of tubing pressure on the tool being electrically actuated. This will minimize the forces that the electric actuator must overcome when actuating the tool. While clearly this will facilitate the use of actuators having less force generating capacity, rendering a force transmitter in a valve insensitive to tubing pressure is useful for any type of actuator including hydraulic actuators. In the disclosure hereof, activators of both lesser and greater force generating capacity are addressed.

Figure 1:
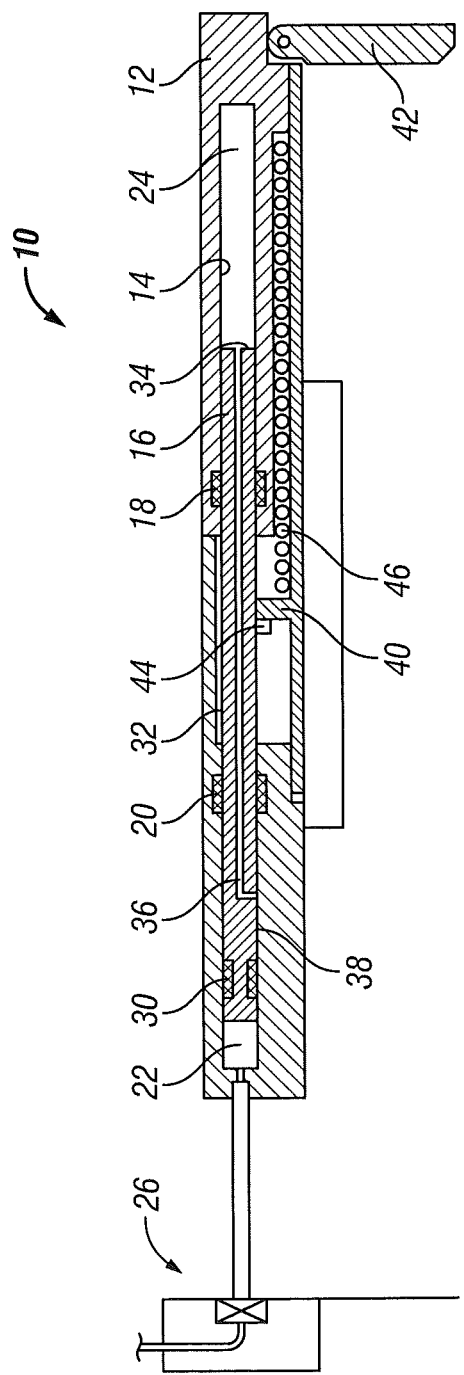
FIG. 1 is a schematic view of a tubing pressure insensitive electrically actuated SCSSV and actuation configuration.

Referring to FIG. 1 a first embodiment of a tubing pressure insensitive actuator system configured as an Electrically Actuated SCSSV ("ESCSSV") 10 is illustrated. The ESCSSV 10 includes a housing 12 having a bore 14 therein. A force transmitter 16, which may be a piston, ball nut, rod, etc., is slidingly and sealingly disposed within the bore 14. The housing 12 includes two sets of seals 18 and 20 that interact with the force transmitter 16 to provide a fluid tight seal therewith. The seals allow movement of the force transmitter in either longitudinal direction based upon applied differential fluid pressure across the force transmitter 16 and also prevent tubing pressure from acting on the force transmitter in a way that would create any differential pressure thereon. More specifically, because tubing pressure does not act on either end of the force transmitter, the force transmitter is insensitive to tubing pressure even though the force transmitter is exposed to tubing pressure along its length. This is desirable because the force required to actuate the valve through movement of the force transmitter is reduced due to not having to overcome tubing pressure. The force transmitter creates two relatively large fluid chambers 22 and 24 within the housing 12. One fluid chamber 22 contains hydraulic fluid that is pressurizable by a pressure source 26, while the other chamber 24 is filled with a compressible fluid such as air that may be at atmospheric pressure. In the FIG. 1 illustration, the pressure source 26 is a pump and hydraulic fluid reservoir to supply the pump. In one embodiment, the pump is an electric pump and thus will include a power cable 28 that may extend to a remote location such as a surface location or may extend only to an on-board power source (not shown). Pressure supplied by the source 26 to the chamber 22 will cause the force transmitter 16 to be displaced within the housing 12 toward the chamber 24. A force transmitter ring seal 30 ensures that hydraulic fluid from the source 26 does not escape around the force transmitter 16.

The force transmitter 16 itself defines a fluid conduit 32 therein that extends from one end 34 of the force transmitter 16 substantially axially to a dog leg 36 where the conduit 32 is directed to an annular space 38 defined between the force transmitter 16, the bore 14, the seal 20 and the force transmitter ring seal 30. This annular space 38 is sealed and thus will deadhead any fluid in the conduit 32. It is thereby invisible functionally with respect to an opening operation of the ESCSSV. The purpose of the conduit 32, dogleg 34 and annular space 38 is to ensure that the force transmitter is biased to a valve closed condition if one or more of the seal 20 fails.

Alternately stated, the annular space 38 only becomes a functional part of the ESCSSV if and when the seal 20 is breached by tubing pressure applied thereto. This function will be further described hereunder.

The force transmitter 16 is further in operable communication with a flow tube 40 of the ESCSSV 10 such that the flow tube 40 is urged toward a flapper valve 42 to open the same upon activation of the ESCSSV 10. Any means for causing the flow tube 40 to move with the force transmitter is acceptable. In one embodiment, an interengagement 44 could simply be a tab on the force transmitter 16 as shown that is sufficiently strong to maintain structural integrity against a power spring 46 and any pressure differential across a flapper 48.

In this embodiment, chamber 24 is filled with a compressible fluid at a pressure easily overcomable by increased hydraulic pressure in chamber 22 or by an electric activator directly acting upon the force transmitter. In one embodiment, the pressure in chamber 24 is atmospheric pressure. The fluid may be air, for example, but in any event will be selected to have chemical properties not contraindicated for the type of activator utilized and in contact therewith.

Upon pressurization of chamber 22 by source 26, the force transmitter 16 moves farther into chamber 24 than is depicted in FIG. 1 and consequently urges the flow tube 40 against the flapper valve 42 causing the same to open. The ESCSSV will remain in this open condition while pressure on the chamber 22 is maintained. Upon loss of such pressure, the valve will close due to the action of a power spring 46 in a way familiar to the art.

In the event that seal 20 fails while the valve 10 is in the downhole environment, tubing pressure will enter annulus 38. The pressure in annulus 38 is transmitted through dogleg 36 and conduit 32 to chamber 24. Pressure in this chamber will cause the valve 10 to fail closed. Alternately, if seal 18 fails, pressure is directly transmitted to chamber 24 with the same result of biasing the valve 10 to a closed position. A failure of both seals 18 and 20 will also result in a biasing of the valve to a closed position.

Figure 2:
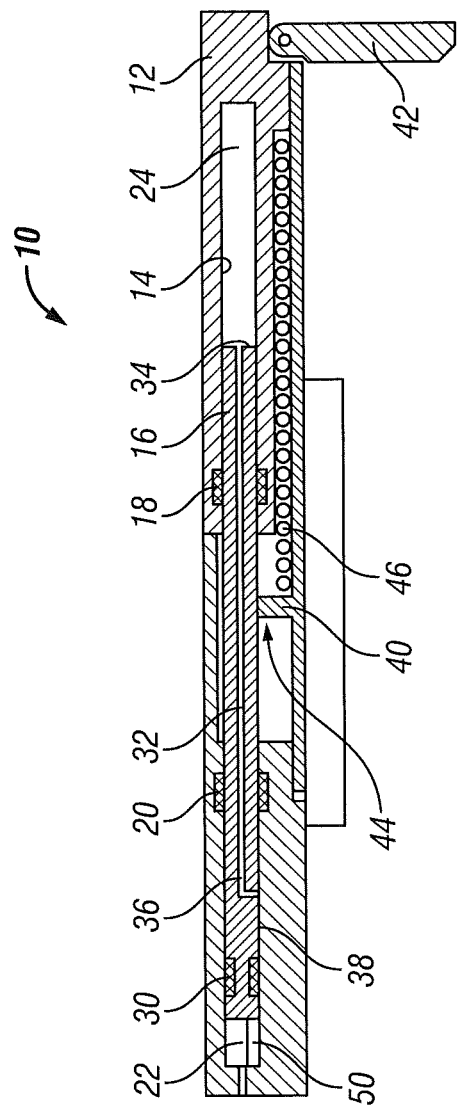
FIG. 2 is a schematic view of an alternate tubing pressure insensitive electrically actuated SCSSV and actuation configuration.

In another embodiment, referring to FIG. 2, pressure source 26 of FIG. 1 is eliminated in favor of an activator 50 that is housed within chamber 22 or chamber 24. The fluid in both chambers 22 and 24 must be of a nature that its volume is changeable without a significant change in pressure thereof. Compressible fluids such as air may be used as well as other fluids having the identified properties. The activator 50 may be an electromechanical device such as a lead screw, solenoid, etc. and will be configured as a push or a pull activator depending upon which chamber houses the activator 50. In the event that the activator 50 is housed in chamber 22 in the illustrated embodiment, it will be configured as a push activator and if the activator 50 is to be housed in the chamber 24, it will be configured as a pull activator. It is further to be appreciated that dual activators may also be used in this embodiment where one is a pull activator and one is a push activator. In other respects, FIG. 2 is similar to FIG. 1 herein.

Figure 3:
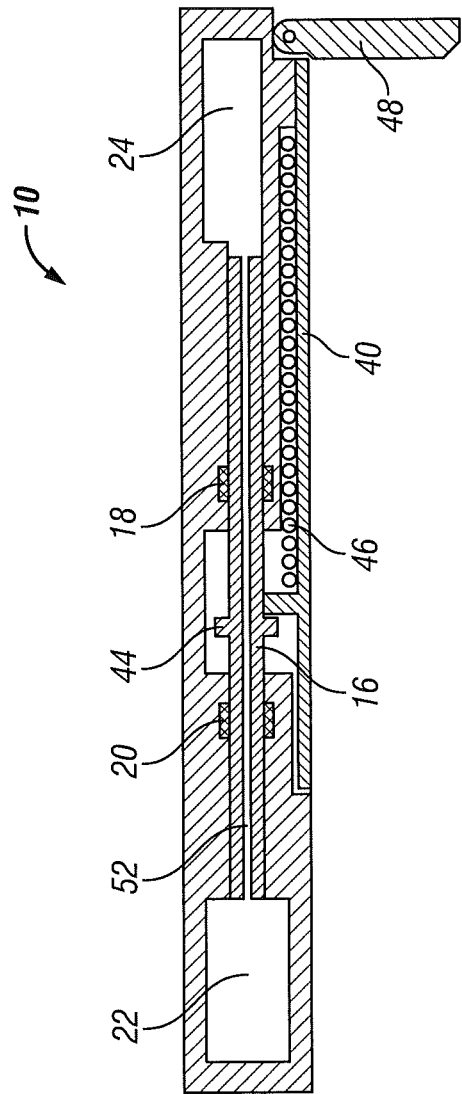
FIG. 3 is a schematic view of another alternate tubing pressure insensitive electrically actuated SCSSV and actuation configuration.

Referring to FIG. 3, another embodiment is illustrated. In this embodiment, seals 18 and 20 remain but force transmitter ring seal 30 has been eliminated. This is beneficial in that fewer seals equate to lower drag on the force transmitter 16 during movement thereof. Also, distinct in this embodiment is a channel 52 extending axially through the force transmitter 16 directly fluidly connecting the chamber 22 to the chamber 24. Due to the channel 52, pressure in chambers 22 and 24 is always equal. Tubing pressure is isolated by seals 18 and 20 as in previously addressed embodiments. In this embodiment, if either of the seals fails, tubing pressure is immediately transmitted to both ends of force transmitter 16 such that it still maintains a balance of pressure and is unaffected thereby. This embodiment will include one or more activators in either or both of the chambers 22 and 24, which may push or pull as required to bias the force transmitter against the power spring 46 and any differential pressure across the flapper 48. Additionally, it is to be noted that in the embodiment of FIG. 3, the fluid in chambers 22 and 24 need not be of a type that is volumetrically changeable without a significant change in pressure as is required in at least one of the chambers for each of FIGS. 1 and 2 but the embodiment of FIG. 3 also allows the use of incompressible fluids due to the ability of the system to move fluid from chamber to chamber. As in the previous embodiments, the activator is housed within the fluid and is thereby protected from potentially deleterious wellbore fluids. Further, it is noted that in the event that a hold open device is to be used in the valve 10, it can also be disposed within one or both of chambers 22 and 24 to protect the same from wellbore fluids.

With the embodiment of FIG. 3, it is also to be appreciated that a plurality of the illustrated systems could be used in conjunction with a single flow tube to have backup actuation capability. This is because, due to balancing, the actuator system that is not working does not create any significant load on the valve 10 but rather will act only as a shock absorber to some extent. Such plural systems may also be used together if required or desired for a particular application.

Figure 4:
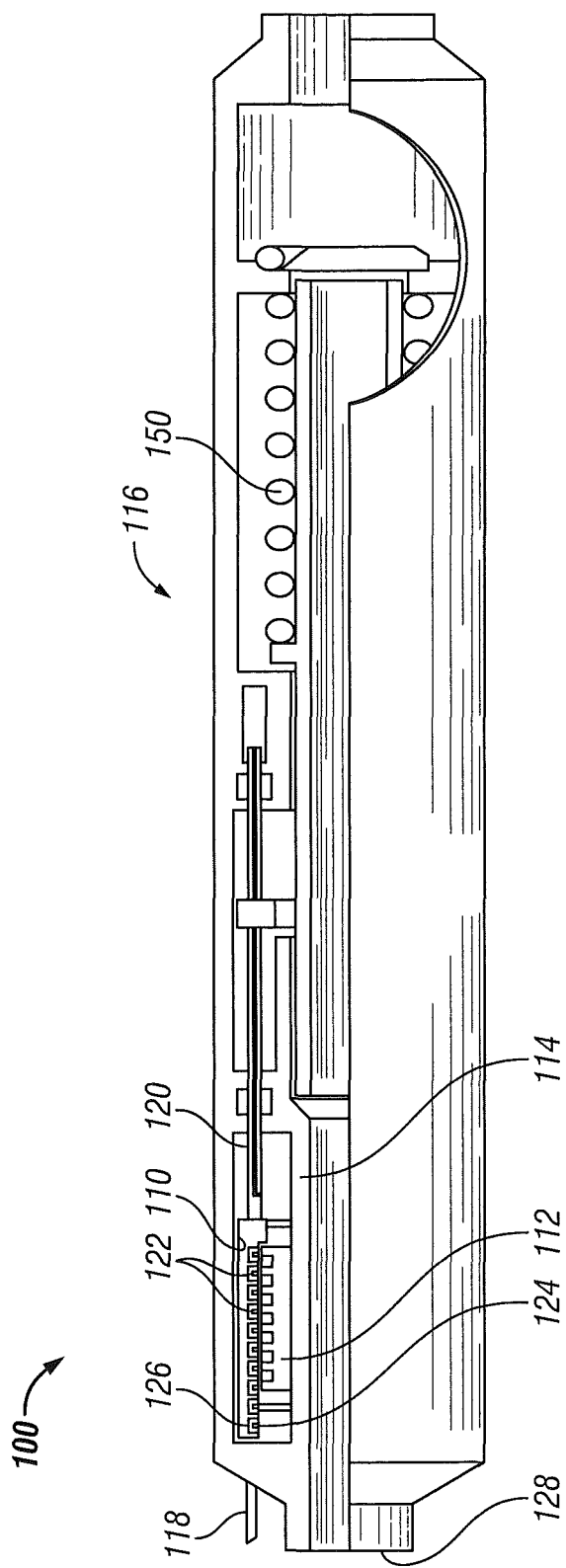
FIG. 4 is a schematic view of another electrically actuated SCSSV.

For use in connection with the foregoing embodiments or other configurations is an electrically based activator illustrated in FIG. 4. In this embodiment, the activator 100 comprises a permanent magnet carrier 110 (shown radially outwardly) and a coil carrier 112 (shown radially inwardly), as illustrated that works together as the prime mover (activator) for the safety valve embodiment. It is to be understood that these components can be reversed while retaining function as described hereunder. More specifically, the permanent magnets can be interchanged with the coils with the carriers in the same places (i.e. the outside carrier 110 movable and the inside carrier 112 fixed) or the carriers may be reversed in their function with regard to movement or stationary duty such that the outside carrier 110 is fixed and the inside carrier 112 is mobile. The mobile carrier (whether the permanent magnet carrier 110 of the coil carrier 112) will be connected to the piston 120 and hence overall function will be the same. It is to be noted that in embodiments where the coil carrier, whether positioned on the inside or outside is mobile, consideration of supplying current thereto must be given and could be through slidable contacts or one or more flexible conductors. In each case the mobile carrier (whether 110 or 112) will require support in the form of a bearing or bushing. These may be positioned at ends of the mobile carrier or may be configured as linear bearings axially disposed relative to the carrier 110. Such bearings include roller bearings, sliding bearings, low friction coated materials or structures such as Polytetrafluoroethylene, etc. As illustrated, the coil carrier 112 is mounted to a housing 114 of a ESCSSV 116 and does not move relative thereto. The coil carrier 112 supports a number of coils thereon that are electrically connected to a power source. The source may be a surface source supplied through a line 118, such as a Tubing Encapsulated Conductor (TEC) line or may be a battery, or other downhole power generation configuration. Further detailed disclosure of the coil carrier including conductor configuration and power supply is found hereunder.

The permanent magnet carrier 110 is operably connected to a piston 120 and hence is intended to be translatable relative to the coil carrier 112, upon activation. A plurality of permanent magnets 122 are mounted at the permanent magnet carrier 110. In one embodiment the permanent magnets are Samarium Cobalt (SmCo) magnets and in another embodiment are Neodymium (Nd) magnets. It is to be understood however that other permanent magnet material may be employed if desired. In one embodiment the magnets 122 are arranged as annular structures with their poles radially oriented. The annular structures may be full annular structures or may be broken annular configurations using an array of individual magnets arranged generally annularly. Regardless of particular construction, each annular magnet or array of magnets will have a pole at its radially inside dimension 124 and a pole at its radially outside dimension 126. Adjacent annular magnets or annular arrays of magnets are arranged to have one pole at the inside dimension of a first magnet 122 and the opposite pole at the inside dimension of the next magnet 122. The switching of pole orientations continues for the number of annular arrays that are present in the permanent magnet carrier 110 such that when viewing the activator 100 in cross section as depicted in FIG. 4, the first permanent magnet at the uphole end 128 of the safety valve 116 will have a south pole on its outside dimension and a north pole on its inside dimension; the second magnet will have a north pole on its outside dimension and a south pole on its inside dimension, etc. This pattern is continued for the axial length of magnets 122 included.

As illustrated there are ten permanent magnets but this is not intended to be viewed as a limitation. Rather it is contemplated that as many or as few magnets desired may be built into a particular system. The number of magnets is related to one or more of the total stroke required, coil groove thickness/depth, wire gauge, slot fill, magnet strength, magnet thickness/width, and optimal relationship between the number of magnets to the number of coils. These parameters are calculated using methods well known in the art and described in the book by Baldea and Nassar identified and incorporated by reference herein below. There will also be an overlap of the movable carrier 110 or 112 so that generated force along the stroke of the tool will remain substantially constant.

Figure 5:
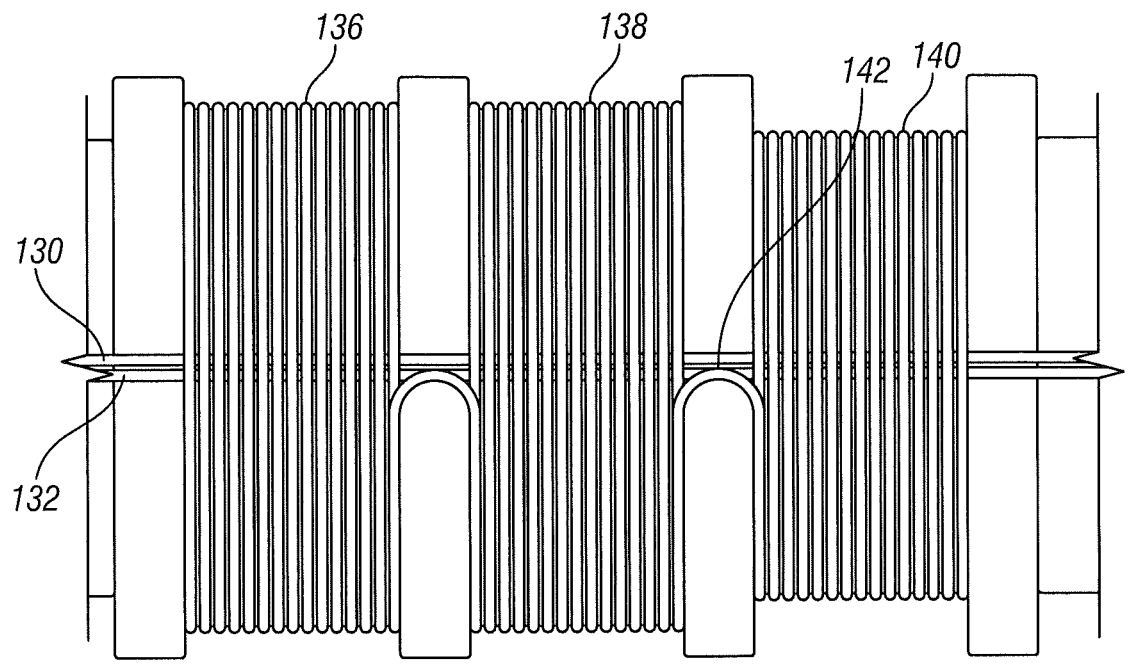
FIG. 5 is a view of the coil configuration for the embodiment illustrated in FIG. 4.
Figure 6:
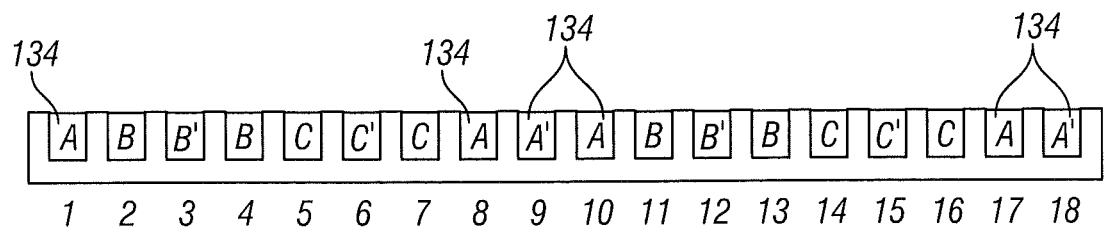
FIG. 6 is a schematic representation of the phases for a plurality of coils on the coil carrier as disclosed herein.

Returning to the coil carrier (whether 110 or 112), and with reference to FIG. 5, current is supplied to the carrier 112 by a plurality of conductors 130 that are run in a groove 132. Each of the plurality of conductors 130 is associated with a phase and is used to create a number of coils 134 (see FIG. 6) having a particular winding orientation and a number of coils having a reversed winding orientation. FIG. 6 provides a graphic understanding of the foregoing sentence. In the particular example there are three conductors 130 because there are three phases, A, B and C. Referring back to FIG. 5, the first coil 136 of the number of coils 134 is illustrated with a counterclockwise coil wind orientation (when the carrier 112 is view from an uphole end thereof) and represents phase A. The second coil 138, also having a counterclockwise wind orientation represents phase B. The third shown coil 140 again uses the conductor associated with phase B and has a wind orientation that is clockwise and so the phase is slightly different and given designation B'. A close view of the portion of the groove 132 that is visible between coils 138 and 140 reveals the conductor for phase B doing a 180 degree bend 142 to change wind direction for the coil 140. The plurality of conductors 130 will continue and be used to wind more coils than shown and in addition integrate phase C as is shown in FIG. 6. The winding pattern is selected to reduce cogging or torque ripple and is further taught in "Linear electric actuators and generators" by I. Boldea, S. A. Nasar published by Cambridge University Press, 1997 under ISBN 0521480175, 9780521480178. This publication is incorporated by reference herein in its entirety. There will further be a controller associated with the ESCSSV 116 that is configured to supply current to each phase so that a magnetic field generated by the coil carrier 112 will move in the downhole direction in sequence thereby urging the permanent magnet carrier downhole in response thereto.

It is to be appreciated that the permanent magnets 122 are positioned at the radially inside surface of the permanent magnet carrier 110 and the coils 136, 138, etc. are positioned at the radially outside surface of the coil carrier 112 so that an air gap between the permanent magnets and the coils is minimized.

The activator 100 as described is capable of actuating the ESCSSV 116 using a very small amount of power, which is on the order of about 200 watts. As long as power is maintained the ESCSSV will remain open; when power is lost (planned or unplanned), the valve 116 will close in accordance with known safety valve mechanics reliant on a power spring 150.

Figure 7:
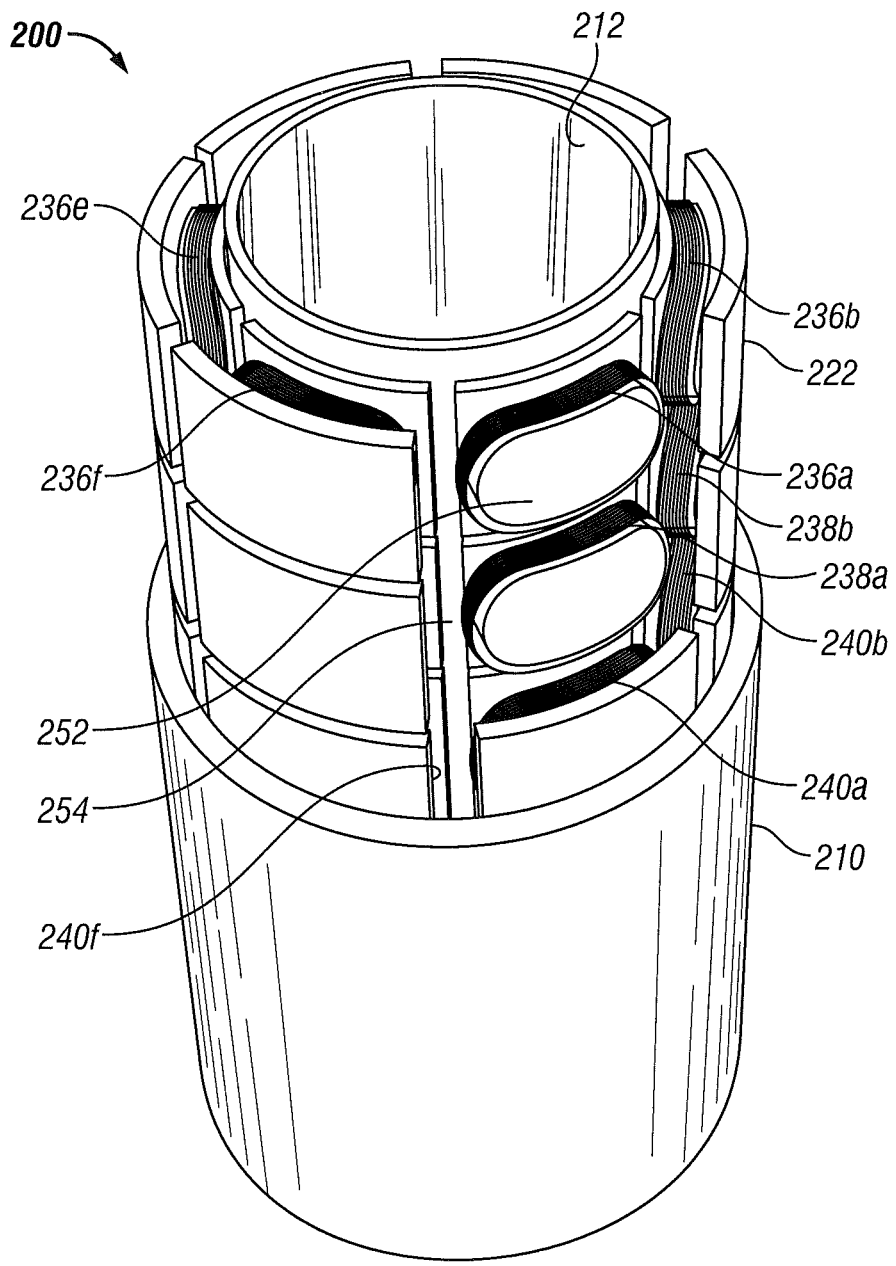
FIG. 7 is a schematic representation of an alternate activator for use with the ESCSSV of FIG. 4.

Referring now to FIG. 7, a perspective view of an alternate activator 200 for the embodiment of FIG. 4 is illustrated. The view includes a permanent magnet carrier, permanent magnets 222, a coil carrier 212, and a plurality of coilettes (236a-236f, 238a-238f, 240a-240f) making up each functional coil 236, 238, 240 disposed at the coil carrier. Further, a back iron 252 is included for each coil. The numerals (other than 252) are 200 series equivalents of the numerals used for FIG. 4 in order to lead the reader to make the appropriate substitution of parts for this embodiment in the safety valve 116 shown in FIG. 4. The most significant distinction of this embodiment is that the coilettes are not annular thereby facilitating easier use of linear bearings for the mobile carrier. Instead, the function of each of the coils 236, 238, 240 as in the FIG. 4 embodiment are substituted by, in this iteration, six smaller perimetrically wound coilettes 236a-236f, 238a-238f, 240a-240f, etc. for the number of functional coils to be used in any particular activator. This construction leaves a gap 254 between perimetrically adjacent coils where a linear bearing may be seated. The magnetic function of the coil 236 is provided by coilettes 236a-236f as an annular array of coilettes which together effectively form a coil. These effective coils are powered in a manner identical to the FIG. 4 embodiment and follow the pattern of FIG. 6. Resultantly the permanent magnet carrier will move responsive to the moving magnetic fields generated by the coils 236, 238, 240, etc. in the coil carrier 212.

While preferred embodiments have been shown and described, modifications and substitutions may be made thereto without departing from the spirit and scope of the invention. Accordingly, it is to be understood that the present invention has been described by way of illustrations and not limitation.

The invention claimed is:

1. A tubing pressure insensitive actuator system comprising:
    a housing having a bore therein;
    a force transmitter sealingly moveable within the bore the force transmitter defining with the bore two fluid chambers, one at each longitudinal end of the force transmitter;
    at least two seals sealingly positioned between the housing and the force transmitter, one of the seals isolating one end of the force transmitter from tubing pressure and another of the seals isolating another end of the force transmitter from tubing pressure;
    an activator having:
    a permanent magnet carrier;
    a plurality of permanent magnets mounted to the permanent magnet carrier;
    a coil carrier disposed in magnetic field proximity to the permanent magnet carrier; and
    a plurality of coils mounted to the coil carrier, one of the permanent magnet carrier and the coil carrier being movable relative to the other of the permanent magnet carrier and coil carrier, and being connected to the force transmitter.

2. A tubing pressure insensitive actuator system for an electric surface controlled subsurface safety valve comprising:
    a subsurface safety valve housing supporting a flow tube, a flapper and a power spring, the housing having a force transmitter bore therein;
    a force transmitter sealingly moveable within the force transmitter bore, the force transmitter defining with the bore two fluid chambers, one at each longitudinal end of the force transmitter, at least one of the chambers containing an electric activator in operable communication with the force transmitter;
    an interengagement at the force transmitter, force transmissively engaged with the flow tube, the interengagement exposed to tubing pressure during use;
    at least two seals sealingly positioned between the housing and the force transmitter, one of the seals isolating one end of the force transmitter from tubing pressure and another of the seals isolating another end of the force transmitter from tubing pressure;
    an activator having:
    a permanent magnet carrier;
    a plurality of permanent magnets mounted to the permanent magnet carrier;
    a coil carrier disposed in magnetic field proximity to the permanent magnet carrier; and
    a plurality of coils mounted to the coil carrier, one of the permanent magnet carrier and the coil carrier being movable relative to the other of the permanent magnet carrier and coil carrier, and being connected to the force transmitter.

3. A method for reducing force requirements of an actuator in a downhole environment comprising:
    sealing a force transmitter within a housing to isolate ends of the force transmitter from tubing pressure during use;
    initiating an activator having:
    a permanent magnet carrier;
    a plurality of permanent magnets mounted to the permanent magnet carrier;
    a coil carrier disposed in magnetic field proximity to the permanent magnet carrier;
    a plurality of coils mounted to the coil carrier, one of the permanent magnet carrier and the coil carrier being movable relative to the other of the permanent magnet carrier and coil carrier, and being connected to the force transmitter; and
    urging the force transmitter in a direction commensurate with activating a downhole tool, the actuator generating enough force to activate the downhole tool other than to overcome tubing pressure.

* * * * *